United States Patent [19]

Ballendux et al.

[11] Patent Number: 4,475,641
[45] Date of Patent: Oct. 9, 1984

[54] DOUBLE ACTING HYDRAULIC ACCUMULATOR FOR POWER SHIFT TRANSMISSION

[75] Inventors: Gerardus M. Ballendux, Waukesha; Stephen J. McCormick, Milwaukee, both of Wis.

[73] Assignee: Allis-Chalmers Corporation, Milwaukee, Wis.

[21] Appl. No.: 313,381

[22] Filed: Oct. 21, 1981

[51] Int. Cl.³ .................. F16D 25/10; F15B 15/22
[52] U.S. Cl. .................. 192/87.15; 192/87.14; 192/87.18; 138/31; 91/5; 91/530
[58] Field of Search .............. 192/87.15, 87.18, 87.14; 138/31; 91/5, 530, 531

[56] References Cited

U.S. PATENT DOCUMENTS

| | | | |
|---|---|---|---|
| 3,780,762 | 12/1973 | Mathews et al. | 192/4 A X |
| 3,808,810 | 5/1974 | Schott et al. | 192/4 A X |
| 3,831,725 | 8/1974 | Schott | 192/3.27 X |
| 3,896,705 | 7/1975 | Patton | 192/87.18 X |
| 3,979,998 | 9/1976 | Wada | 91/26 |
| 4,046,160 | 9/1977 | Horsch | 192/87.18 X |
| 4,138,846 | 2/1979 | Sakakibara | 138/31 X |
| 4,161,256 | 7/1979 | Seaberg | 91/531 X |

FOREIGN PATENT DOCUMENTS

| | | | |
|---|---|---|---|
| WO81/00600 | 3/1981 | PCT Int'l Appl. | 91/531 |
| 225713 | 11/1969 | U.S.S.R. | 192/87.18 |

Primary Examiner—Rodney H. Bonck
Assistant Examiner—David D. House
Attorney, Agent, or Firm—Arthur L. Nelson

[57] ABSTRACT

A double acting hydraulic actuator for operating in a power shift transmission. An accumulator operates with two hydraulic clutches to dampen surges in pressures and to store energy in the hydraulic system during operation of the hydraulic system.

15 Claims, 5 Drawing Figures

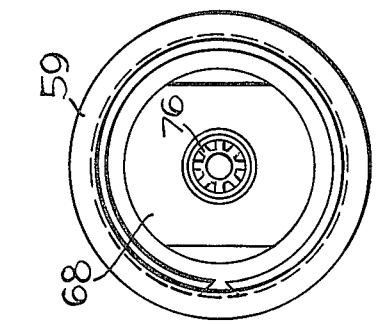
FIG. 4
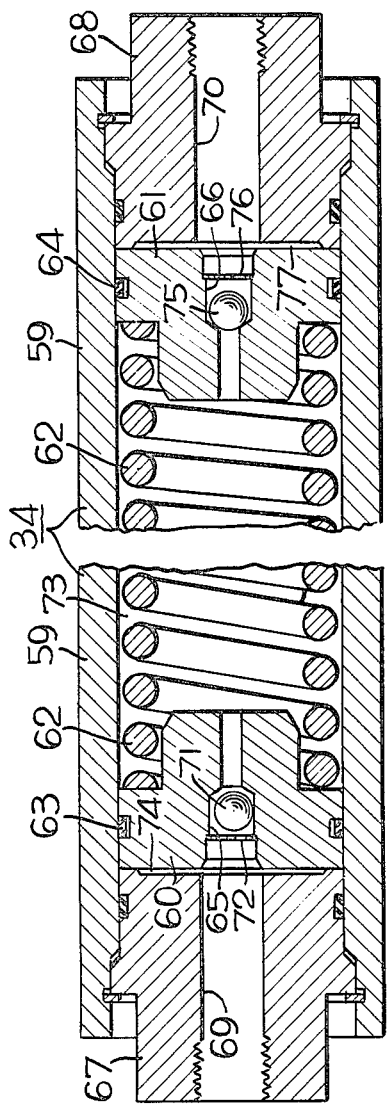
FIG. 3
| GEAR | CLUTCHES |
|---|---|
| R | C2 & A2 |
| N | |
| 1 | B1 & A2 |
| 2 | B1 & C1 |
| 3 | A2 & C1 |
| 4 | B2 & C1 |
| 5 | A1 & C1 |
| 6 | A1 & A2 |
FIG. 5

DOUBLE ACTING HYDRAULIC ACCUMULATOR FOR POWER SHIFT TRANSMISSION

This invention relates to a power shift transmission and more particularly to a double acting hydraulic accumulator operating with two clutches of a power shift transmission to dampen pressure surges and to store energy of the system while operating the hydraulic power shift control system.

Power shift transmissions operate selectively through hydraulically actuated clutches for selected power paths through the transmission. Engaging and disengaging of the clutches requires some form of modulation of pressure to provide a smooth transition of power from one of the clutches to the other as the clutches are selectively engaged. Surges in pressure cause roughness which should be avoided. A hydraulic accumulator can be used to absorb the variations of pressure of the pressurized actuating fluid to provide a smoother operation of the clutches. Accordingly this invention provides for a double acting hydraulic accumulator which is positioned between two low speed clutches. The double acting hydraulic actuator operates in either direction and serves two hydraulic clutches to overcome any roughness due to surges in the pressure of the hydraulic fluid and to store energy in the accumulator for a smoother shifting of the hydraulic clutches.

Although the U.S. Pat. No. 3,831,725 Schott, U.S. Pat. No. 3,808,810 Schott et al and U.S. Pat. No. 3,780,762 Mathews et al show hydraulic accumulators and modulating valves in the hydraulic transmission shifting device the applicant's invention provides for a double acting hydraulic accumulator positioned between the two low speed clutches having manual modulation or inching through an inching valve. The double acting hydraulic accumulator operates with the engaging clutch while the opposite end of the accumulator is connected to the disengaging clutch. It also provides a drain line for the accumulator to drain out fluid leakage. The double acting hydraulic accumulator provides for cushioning of surging pressure and also provides a means of storing hydraulic energy in the system to provide the shifting of the hydraulically actuated clutches.

It is an object of this invention to provide a double acting hydraulic accumulator for operation in a power shift transmission.

It is another object of this invention to provide a power shift transmission having an inching valve for the low speed operation operating with a double acting hydraulic accumulator for the two low speed clutches.

It is a further object of this invention to provide a double acting hydraulic accumulator having check valves in each end of the accumulator to allow for drainage of fluid to sump from the disengaging clutch. Selective operation of the hydraulic clutches reverses the operation of the double acting hydraulic accumulator.

The objects of this invention are accomplished by using a double acting hydraulic accumulator between two low speed clutches that are hydraulically actuated. The hydraulic accumulator operates with one of the hydraulically operated clutches, as the clutch is being engaged to reduce pressure surges in the hydraulic system while the other end of the hydraulic accumulator is connected to the disengaging clutch to vent fluid to sump. The hydraulic accumulator includes a hydraulic cylinder with opposing pistons forming pressurizing chambers. A passage is in communication between the hydraulically actuated clutch and an activated pressurizing chamber in the accumulator. A check valve is positioned in the system on each end of the accumulator to prevent flow of the fluid through the piston from the engaging clutch hydraulic actuator and to allow fluid to flow from the pressurizing hydraulic fluid chamber and the disengaging clutch connected to the inactivated end of the hydraulic accumulator.

Referring to the drawing the preferred embodiment of this invention is illustrated.

FIG. 3 is a cross section view of a double acting hydraulic accumulator.

FIG. 4 is an end view taken from the right hand side of FIG. 3.

FIG. 5 is a table illustrating the clutches actuated in the transmission for the speed ratios as indicated.

Figure 1:
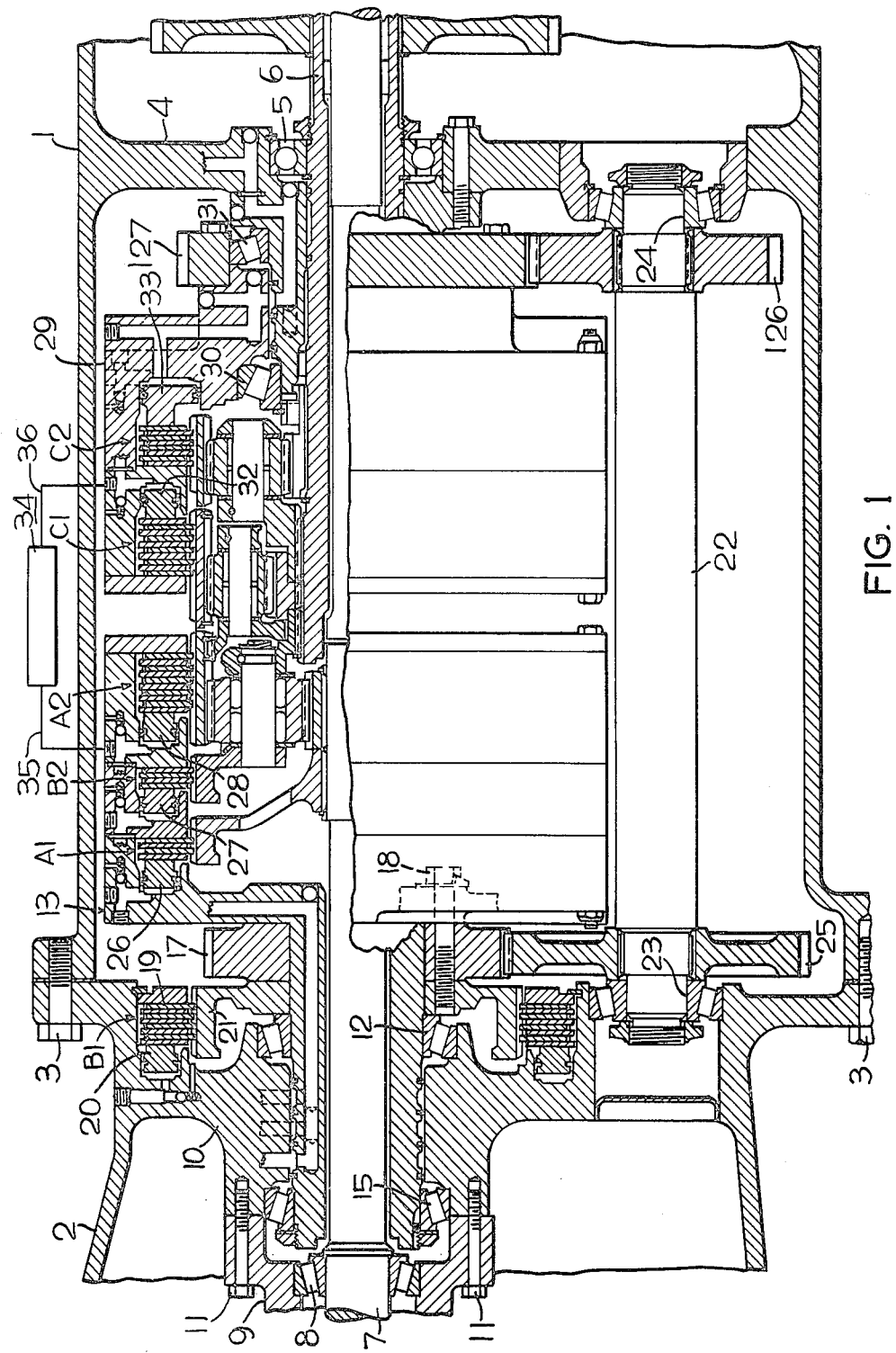
FIG. 1 illustrates a cross section view of a power shift transmission and the accumulator.

Referring to FIG. 1 a transmission housing 1 is fastened to the end wall 2 by a plurality of bolts 3. The partition 4 supports the bearing assembly 5 which rotatably supports the output shaft 6. The input shaft 7 is rotatably supported in the bearing assembly 8 carried in the bearing support 9. Bearing support 9 is fastened to the end wall 10 by bolts 11. The end wall 10 supports the bearing assembly 12 which rotatably supports the clutch carrier 13. Clutch carrier 13 is rotatably supported on the bearing assemblies 12 and 15. Clutch carrier 13 carries the drive gear 17 which is fastened by a plurality of bolts 18. The brake assembly B1 includes a disc pack 19 operated by hydraulic actuator 20 having brake discs alternately supported on the transmission housing 1 and the brake hub 21.

The countershaft 22 is rotatably supported in the bearing assemblies 23 and 24. The countershaft 22 carries the gears 25 and 126. The gear 126 drives the gear 127 on the clutch carrier 29.

The clutch carrier 13 carries the clutches A1, B2 and A2 which are selectively operated hydraulically by the hydraulic actuators 26, 27 and 28 through a hydraulic system which will be subsequently described. Clutch carrier 29 is rotatably supported on the bearing assemblies 30 and 31. The clutch carrier 29 carries the clutches C1 and C2 which are operated by hydraulic actuators 32 and 33, respectively. The clutches A2 and C1 have hydraulic actuators 28 and 32, respectively, which are in communication with the double actuating hydraulic accumulator 34 through conduits 35 and 36.

Figure 2:
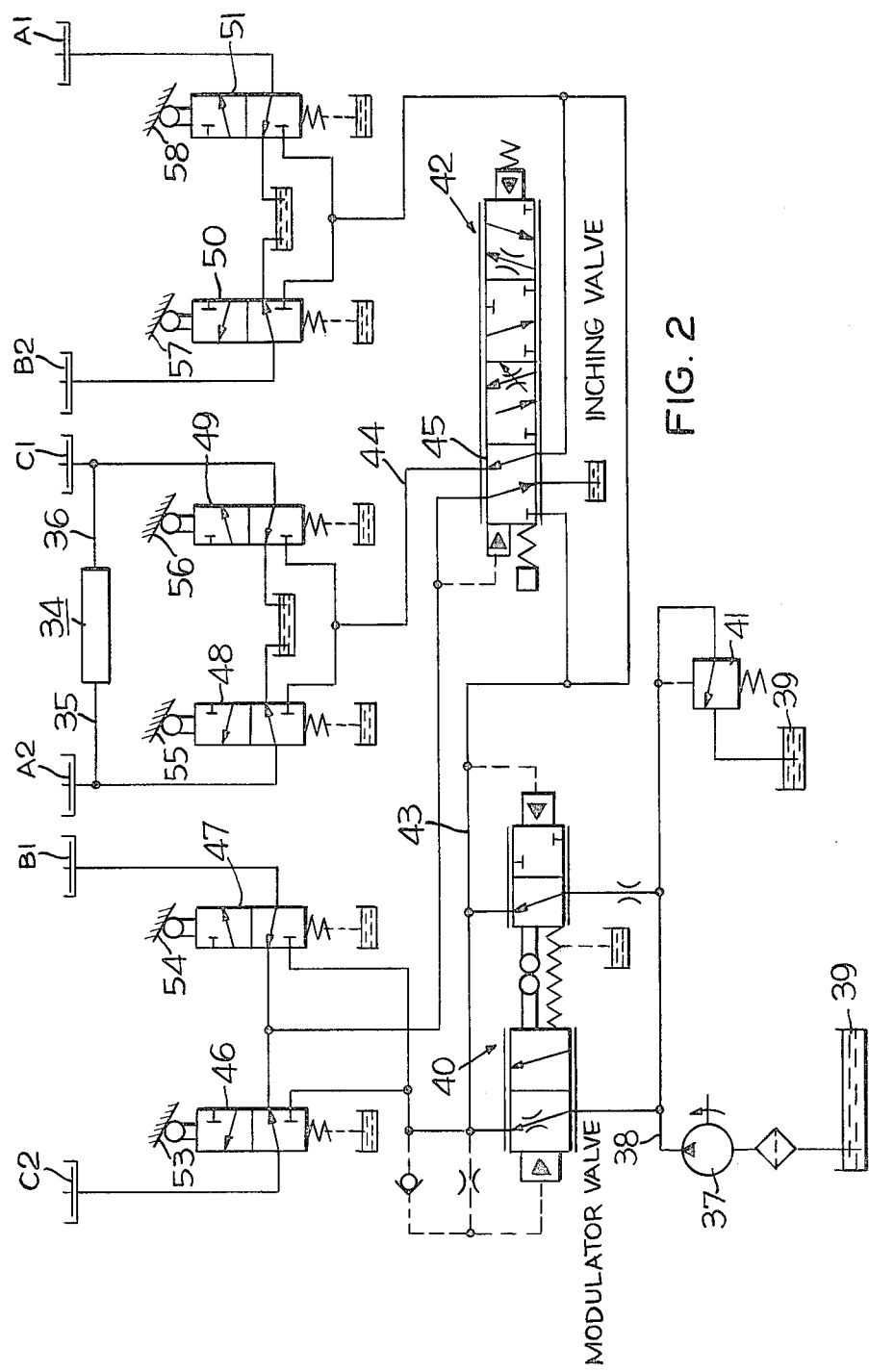
FIG. 2 is a schematic diagram of the hydraulic system of the power shift transmission.

Referring to FIG. 2, the pump 37 pressurizes fluid in the conduit 38 and receives supply fluid from the reservoir 39. Pressurized fluid in conduit 38 is supplied to the modulator valve 40. Conduit 38 is connected to the relief valve 41 which returns fluid at predetermined pressure to the reservoir 39.

Normally a relatively constant pressure is maintained in the conduit 38 due to the relief of valve 41 at the high pressure side of the pump 37. The shifting of the transmission is accomplished through the modulator valve 40 which is directly connected to the clutches C2, B2 and A1 and brake B1. The downstream side of the modulator valve is also connected to the inching valve 42 through conduit 43 which in turn is connected to the clutches C1 and A2. Normally, the inching valve 42 allows direct flow from the conduit 43 to conduit 44 through the inching valve 42. Clutches A2 and C1 are the hydraulic clutches for the low speeds as is indicated in FIG. 5. These clutches are controlled by the inching valve 42 which is a manually operated valve and can be moved to the positions as indicated. The section 45 is normally connecting the conduit 43 to conduit 44 to the clutches A2 and C1.

The control valves for the respective clutches are operated through a cammed mechanism as indicated by the cammed surfaces operating respectively the valves 46, 47, 48, 49, 50 and 51. Control valves respectively operate the clutches and brake C2, B1, A2, C1, B2 and A1. Clutches and brake C2, B1, B2 and A1 are operated through the modulator valve 40 during normal operation to insure there is a smooth transition of power from the one power shift clutch to the other as the speed ratio is changed in the transmission. The clutches A2 and C1 are also operated in a similar manner through the modulator valve, however, the operator has the option of using the inching valve 42 which is positioned intermediate the modulator valve and the clutches A2 and C1.

Pulsations and pressure changes in the system cause roughness, particularly in the low speed operations, and are inherent with the particular hydraulic system used. The double acting hydraulic accumulator 34 is positioned intermediate the hydraulic actuators for the clutches A2 and C1 and the control valves 48 and 49. A control lever normally operates the camming arrangement which includes the cam surfaces 53 through 58. Selective operation of the shift control lever will selectively engage the selected control valve as indicated. The inching valve can be used in conjunction with the control valves as well to provide the desired operation of the transmission.

Referring to FIGS. 3 and 4, the double acting hydraulic accumulator 34 is shown. The accumulator includes a cylinder 59 receiving the pistons 60 and 61 which are biased to an extreme position by the spring 62. Each piston is provided with a seal 63 and 64, respectively, and is formed with a central passage 65 and 66. Sealed end walls 67 and 68 are positioned in their respective ends and each retained by a snap ring and each also carries a seal. The end wall 67 forms a passage 69 while the end wall 68 forms a passage 70. These passages provide a means for connection to the conduits 35 and 36, respectively.

Piston 60 carries a check valve comprising a ball 71 retained in position by a retainer 72 which allows fluid flow from the spring chamber 73 but blocks the flow of fluid into the chamber causing the piston to move in the right hand direction as pressurized fluid is permitted to flow into the passage 69. The pressurizing chamber 74 expands from pressurized fluid flowing into the passage 69. Similarly, the piston 61 carries a check valve comprising the ball 75 retained in its position by the retainer 76. The pressurizing chamber 77 is in communication with the passage 70 and allows the pressurizing chamber 77 to expand as pressurized fluid is admitted through the passage 70.

The operation of the device will be described in the following paragraphs.

When the pump 37 is in operation, fluid is pressurized into conduit 38 and flows through the modulator valve to the conduit 43. Pressurized fluid is normally supplied from the modulator valve to the valves 46 through 51. Flow to clutches A2 and C1 is admitted through the inching valve 42. Normally the inching valve is open to permit the pressurized fluid to flow to the valves 48 and 49. Selective operation of the valves is accomplished through a shifting mechanism operated by the operator of the vehicle. Selective operation will provide shifting of the transmission through the speed ranges as indicated in FIG. 5. The transmission as indicated in FIG. 1 is a countershaft and power shift transmission in which the clutches are actuated hydraulically. The drive is from the input shaft 7 to the output shaft 6 through the power shift transmission to provide the desired speed ratio of the operator.

The inching valve provides a manual means for modulating the pressure of the pressurized fluid as it is supplied to the valves 48 and 49 per the clutches A2 and C1. To assure no pulsating pressure changes pass through the valves and are transmitted to the hydraulic actuators in the clutches A2 and C1 a double acting hydraulic accumulator 34 is positioned between these two clutches. The hydraulic accumulator is provided such that the actuating valve allows pressurized fluid to flow to the engaged clutch and also to the connecting passage in the end of the accumulator. Pressurized fluid flows into the accumulator. For the purpose of illustration, passage 70 will be considered transmitting pressurized fluid into the pressurizing chamber of the accumulator. The check valve 75 closes causing the piston to move in the left hand direction and expanding the pressurizing chamber 77. As the clutch is engaged the pressurizing chamber expands to its maximum volume and during the process reduces any pressure surges which may be objectionable in actuating clutch C1. Simultaneously, the passage 69 is permitted to allow drainage of fluid from the pressurizing chamber 74 through the valve 48. Since the valve 48 at this time is connected to sump, this provides a drain line for this side of the double acting accumulator.

When the clutch C1 is disengaged, the fluid flow from the pressurized chamber 77 is permitted to return through passage 70 through the valve 49 and then to the reservoir. This provides a drain through the valve 75 of the accumulator. During the activating process, however, the accumulator provides a reserve for storing energy and allows the clutch C1 to gradually disengage.

If clutch A2 is the oncoming clutch then pressurized fluid is admitted through the passage 69 to the check valve 71 which closes causing the piston 60 to move in the right hand direction and the pressurizing chamber 74 expands. The same process is repeated until the pressurizing chamber expands to its maximum size and clutch A2 is fully engaged.

The inching valve 42 is manually controlled for either of the clutches A2 or C1 and is connected in series with the modulator valve 40 and either of the control valves 48 or 49. The inching valve is manually moved to throttle the flow of pressurized fluid from the conduit 43 to the conduit 44 and accordingly varies the rate of increase of pressure to the control valves 48 or 49. The inching valve operates only with the clutches A2 and C1 which are the low speed clutches in the transmission. The accumulator operates with the low speed clutches and also has a modulating effect on the pressurized fluid as it is supplied to the clutches for engagement of the clutches A2 and C1.

The embodiments of the invention in which an exclusive property or privilege is claimed are defined as follows:

1. A hydraulic transmission shift control system comprising, a source of pressurized fluid, a transmission shift control valve, a fluid pressure modulating valve connecting between said control valve and said source of pressurized fluid, at least two hydraulic actuators each for engaging one clutch in the transmission and each connected to a control valve, a double acting hydraulic accumulator connected between said two hydraulic actuators including, a hydraulic cylinder having an end wall in each end, two pistons received in said hydraulic cylinder defining two expansible pressurizing chambers with a spring chamber intermediate said pistons with each one of said pressurizing chambers connected to one of said hydraulic actuators to cushion pressure pulses in the hydraulic system, the spring in said spring chamber normally biasing said pistons to cause each pressurizing chamber in said accumulator to return toward a minimum volume, a valve means in one of said pistons isolating one of said pressurizing chambers from said spring chamber in said accumulator when pressurized fluid is admitted to said pressurizing chamber and a valve means in the other of said pistons permitting drainage of fluid from said spring chamber through the other one of said pressurizing chambers of said accumulator when one of said accumulators is actuated thereby providing an automatic drain when said control valve is open.

2. A hydraulic transmission shift control system as set forth in claim 1 wherein said hydraulic accumulator includes a cylinder receiving two opposing axially aligned pistons forming said pressurizing chambers.

3. A hydraulic transmission shift control system as set forth in claim 1 wherein each of said valve means defines a check valve.

4. A hydraulic shift control system as set forth in claim 1 wherein said piston in each accumulator forms an axial passage through said piston, a check valve in each of said passages to prevent inward flow through said passages and allow return flow out of said passages.

5. A hydraulic transmission shift control system as set forth in claim 1 wherein said modulating valve defines a manually controlled modulating valve.

6. A hydraulic transmission shift control system as set forth in claim 1 including a pressure regulating valve connected to said source of pressurized fluid to maintain a predetermined constant pressure from said source of pressurized fluid.

7. A hydraulic transmission shift control system as set forth in claim 1 wherein said transmission defines a power shift transmission.

8. A hydraulic transmission shift control system as set forth in claim 1 wherein said hydraulic actuators actuate low speed clutches.

9. A hydraulic transmission shift control system as set forth in claim 1 wherein said double acting hydraulic accumulator defines symmetrical ends.

10. A double acting hydraulic accumulator in a power shift transmission comprising, a source of pressurized fluid and a modulating valve, a first and a second accumulator each including a first and a second piston axially aligned in a single cylinder with each piston defining a pressurizing chamber with the accumulator, resilient means positioned in a spring chamber between said pistons biasing said pistons to a minimum volume position of the pressurizing chambers, said first accumulator defining a passage connected to said pressurizing chamber and through said modulating valve to said source of pressurized fluid and a control valve, said second accumulator defining a passage connected to said pressurizing chamber and through said modulating valve to said source of pressurizing fluid and a control valve, a valve in each of said pistons blocking fluid flow from said pressurizing chamber into said spring chamber and permitting flow from said spring chamber to said pressurizing chamber, said valve alternately causing said accumulator to operate as an accumulator responsive to application of pressure in said pressurizing chamber and permitting flow from said spring chamber to said pressurizing chamber when pressure is relieved.

11. A double acting hydraulic accumulator in a power shift transmission as set forth in claim 10 wherein said double acting accumulator includes a cylindrical sleeve housing.

12. A double acting hydraulic accumulator in a power shift transmission as set forth in claim 10 wherein each of said valves in said accumulator defines a check valve including a valve seat and a valve element, a retainer means for retaining said valve element.

13. A double acting hydraulic accumulator in a power shift transmission as set forth in claim 10 wherein said pistons define spring seats, said spring resiliently positioned between said pistons.

14. A double acting hydraulic accumulator in a power shift transmission as set forth in claim 10 wherein said valves define check valves including a valve element defining a ball, a valve seat on said piston, a retainer means retaining said ball for engagement with said valve seat.

15. A double acting hydraulic accumulator in a power shift transmission as set forth in claim 10 wherein said accumulator defines a sleeve, cylindrical end walls received in the ends of said sleeve defining accumulator end walls, a snap ring for retaining said end walls in operating position.

* * * * *